United States Patent Office 3,303,200
Patented Feb. 7, 1967

3,303,200
PYRAZOLE-1-ETHANOL DERIVATIVES
Milton Wolf, West Chester, and Donald J. Flanigan, Havertown, Pa., assignors to American Home Products Corporation, New York, N.Y., a corporation of Delaware
No Drawing. Filed Nov. 5, 1963, Ser. No. 321,441
13 Claims. (Cl. 260—310)

This invention relates to substituted pyrazole compounds. More particularly this invention relates to new pyrazole-1-ethanol derivatives and to the novel method by which they are prepared.

The new compounds of the present invention in their broadest aspect are encompassed within the following structural formula:

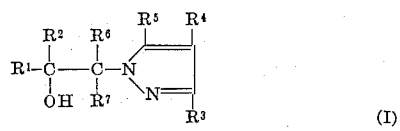

(I)

wherein $R^1$, $R^2$, $R^6$ and $R^7$ are selected from the group consisting of hydrogen, alkyl, haloalkyl, aryl, alkaryl, alkoxy, aryloxy, alkoxyalkyl, hydroxyalkyl, cyano, amino, nitro, carboxamido, carbalkoxy and heterocyclic; $R^3$, $R^4$ and $R^5$ are selected from the group consisting of hydrogen, halogen, alkyl, aryl, aralkyl, alkoxy, aryloxy, alkoxalkyl, amino, hydroxy, hydroxyalkyl cyano carbalkoxy and nitro; and their acid salts.

A preferred class of compounds encompassed within the compounds defined by Formula I are those defined by Formula II below:

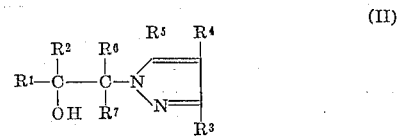

(II)

wherein $R^1$ is selected from the group consisting of lower alkyl haloalkyl, aryl, haloaryl, alkaryl, lower alkoxy, aryloxy, lower alkoxy lower alkyl, hydroxy lower alkyl, cyano and carboxamido; $R^2$, $R^6$ and $R^7$ are hydrogen or lower alkyl; $R^3$, $R^4$ and $R^5$ are selected from the group consisting of hydrogen, halogen, lower alkyl, aryl, aralkyl, alkoxy, aryloxy, alkoxyalkyl, amino, hydroxy, hydroxyalkyl, cyano, carbalkoxy and nitro; and their acid addition salts. Preferably $R^3$ and $R^5$ are hydrogen or lower alkyl and $R^4$ is selected from the group consisting of hydrogen, lower alkyl, halogen, alkoxy, alkoxyalkyl, hydroxy, hydroxyalkyl, amino, cyano and nitro and the thereapeutically acceptable, nontoxic acid addition salts thereof.

The new compounds of the present invention are prepared by the reaction of a substituted epoxide with a selected pyrazole derivative. The reaction is preferably carried out in the presence of a solvent, such as xylene, under reflux for a period of from 2 to about 20 hours. The reflux temperature will of course vary depending on the particular solvent used and the selected compounds undergoing reflux. On cooling a solid separates which is collected by filtration, washed and purified in the conventional manner. Recrystallization from a solvent, such as cyclohexane, is the preferred method of purification. The product, in the form of the free base, can be converted into the acid addition salts, particularly the therapeutically acceptable, nontoxic addition salts. This is accomplished by reaction with inorganic or organic acids such as hydrohalic, sulfuric, nitric, perchloric, phosphoric, formic, acetic, propionic, lactic, oxalic, succinic, maleic, tartaric, citric, asorbic, methane sulfonic, ethane sulfonic, hydroxyethane sulfonic, benzoic, salicylic, p-amino salicylic, toluene sulfonic or naphthalene sulfonic acids.

The new compounds of the present invention are useful for their valuable pharmaceutical properties. More specifically, the compounds of the present invention are useful as hypoglycemic agents. They are also useful for their antiviral and anti-inflammatory properties. When used as hypoglycemic agents, the compounds of the present invention are preferably formed into a pharmaceutical preparation.

The latter contains the specified compound in admixture with a pharmaceutically administrable organic or inorganic carrier, such that the composition is suitable for enteral or parenteral administration. The composition may be prepared in solid form, such as in tablets, or in liquid form such as a solution, suspension or emulsion. Suitable liquid carriers include water, gelatin, lactose, starch, talc, vegetable oils, alcohols, polyalcohols, gums, USP syrups and the like The pharmaceutical composition in addition to the active principle and the carrier may include auxiliary materials such as coloring, stabilizing, wetting or emulsifying agents. It is of course recognized as essential that the carrier as well as any other materials present with the active principle be inert with respect thereto.

When the pharmaceutical preparation is compounded in the manner suggested above, the active compound will be present in an amount of from about 1 to about 500 mg./cc. of the vehicle. Preferably the active compound will be present in an amount of from 1 to about 100 mg./cc. of the carrier. When so prepared, the new compounds may be administered in therapeutic dosage amounts, depending on the condition being treated in an amount of from about 10 mg. to 600 mg./day of the active material.

Reference to the specific examples which follow will provide a better understanding of the new compounds of the present invention and the method by which they are prepared. In these examples, the starting substituted epoxide compounds are known or can be prepared according to the methods described in D. Swern, Chem. Rev., 45, 16 (1949), Org. Syn., vol. 1, 2nd. Ed., J. Wiley & Sons (1941), p. 494, or Heterocyclic Compounds, vol. 1, pp. 3–22, Wiley, New York, 1950. The selected pyrazole compounds likewise are known or are prepared according to the method described in Heterocyclic Compounds, vol. 5, pp. 48–89, Wiley, New York, 1957.

*Example 1*

A solution of 3,5-dimethylpyrazole (24.0 g., 0.25 m.) and styrene oxide (30.1 g., 0.25 m.) in xylene (100 ml.) is refluxed for eight hours. On cooling a colorless solid separates. The product is collected by filtration, washed with xylene, and dried at 100° C.; yield, 37.4 g. (69.1%) of DL-3,5-dimethyl-α-phenylpyrazole-1-ethanol, M. 121–122°[1] (uncorr.). Concentration of the filtrate affords an additional 3.5 g. (6.5%) of off-white solid, M. 119–120° (uncorr.). Total yield=40.9 g. (75.5%). Recrystallization of the crude product from cyclohexane affords colorless prisms, 32.0 g. (59.2%), M. 121–123° (uncorr.).

The base (10.0 g.) is dissolved in a 1:1 mixture of ether-ethyl acetate (200 ml.) and the resulting solution saturated with dry hydrogen chloride gas. *The hydrochloride* separates as a colorless solid which is collected by filtration, washed with ether and dried. Yield, 11.0 g. (94.0%), M. 219–221.5° (uncorrected). Recrystallization from isopropyl alcohol affords colorless prisms of DL - 3,5 - dimethyl - α - phenylpyrazole - 1 - ethanol hydrochloride 9.6 g. (82.0%), M. 220.0–221.5° (uncorr.).

| | |
|---|---|
| DL-3,5-dimethyl-α-phenylpyrazole-1-ethanol hydrochloride _____ mg__ | 1–100 |
| Therapeutically administrable vehicle _____ cc__ | 1 |

---
[1] All temperatures hereinafter reported are centigrade temperatures unless otherwise stated.

Example II

To prepare DL - 4 - methoxy-3,5-dimethyl-α-phenyl-pyrazole-1-ethanol hydrochloride, styrene oxide is reacted with 4-methoxy-3,5-dimethyl pyrazole according to the method of Example I.

Example III

The reaction of styrene oxide (31.9 g., 0.266 m.) with pyrazole (18.1 g., 0.266 m.) in a manner similar to that of Example I, affords the free base. (24.6 g., 49.2%), M. 129–131° C. (uncorr.).

The base is converted to DL-α-phenylpyrazole-1-ethanol hydrochloride as described in Example I, M. 142–144° (uncorr.).

The compound so prepared is used as follows:

DL-α-phenylpyrazole-1-ethanol hydrochloride __mg__ 50
Propylene glycol _____cc__ 1

Example IV

To prepare DL-4-amino-3,5-dimethyl-α-phenoxymethyl-pyrazole-1-ethanol, 1,2-epoxy-3-phenoxypropane is reacted with 4-nitro-3,5-dimethyl-pyrazole according to the method of Example I. The product, DL-3,5-dimethyl-4-nitro-α-phenoxymethylpyrazole - 1 - ethanol, is reduced with platinum oxide and hydrogen (60 p.s.i.), yielding DL-4-amino - 3,5-dimethyl-α-phenoxymethyl-pyrazole-1-ethanol.

Example V

The reaction of 1,2-epoxy-3-phenoxypropane (34.6 g., 0.25 m.) with 3,5-dimethyl-pyrazole (24.1 g., 0.25 m.), in a manner similar to that of Example I affords DL-3,5-dimethyl-α-phenoxymethylpyrazole-1-ethanol (41.4 g., 67.1%) M. 83.5–34.5° (uncorr.). The base is converted to DL - 3,5-dimethyl-α-phenoxymethylpyrazole-1-ethanol hydrochloride as described in Example I, M. 135.5–136.0° (uncorr.).

DL - 3,5 - dimethyl - α - phenoxymethylpyrazole-1-
  ethanol hydrochloride _____mg__ 1–100
Therapeutically administrable vehicle _____cc__ 1

Example VI

To prepare 4-ethoxyethyl-3,5-diethyl-α-phenoxymethyl-pyrazole-1-ethanol hydrochloride, 1,2-epoxy-3-phenoxy-propane is reacted with 4-ethoxyethyl-3,5-diethylpyrazole according to the method of Example I.

Example VII

The reaction of 1,2-epoxy-3-isopropxypropane (15.0 g., 0.129 m.) with 3,5-dimethylpyrazole (12.4 g., 0.129 m.) in a manner similar to that of Example I, yields DL-3,5-dimethyl-α-isopropoxymethylpyrazole-1-ethanol (17.7 g., 65.0%), B.P. 111–113°/1–2 mm., $n_D^{24}$ 1.4774.

The product is used as follows:

DL - 3,5 - dimethyl-α-isopropoxymethylpyrazole - 1-
  ethanol _____mg__ 100
Glycerin (50%) in water _____cc__ 1

Example VIII

DL - α - (p - methoxyphenoxymethyl) - 3,5 - dimethyl-pyrazole-1-ethanole hydrochloride is prepared by reacting 3-(p-methoxyphenoxy) - 1,2 - epoxypropane with 3,5-dimethylpyrazole.

Example IX

The reaction of 1,2-epoxy-3-phenoxypropane (33.1 g., 0.22 m.) with pyrazole (15.0 g., 0.22 m.) in a manner similar to Example I, yields DL-α-phenoxymethylpyrazole-1-ethanol (32.8 g., 68.0%), M. 80.0–80.5° (uncorr.). The base is converted to DL-α-phenoxymethylpyrazole-1-ethanol hydrochloride, in a manner similar to that described in Example I, M. 112.5–114.0° (uncorr.).

The product is used as follows:

DL - α - phenoxymethylpyrazole - 1 - ethanol hydro-
  chloride _____mg__ 1–50
Therapeutically administrable vehicle _____cc__ 1

Example X

To prepare DL-α-(o-trifluoromethylphenoxymethyl)-3,5-dimethyl-1-ethanol hydrochloride, 3 - (o - trifluoromethylphenoxy)-1,2-epoxypropane is reacted with 3,5-dimethylpyrazole.

Example XI

The reaction of 1,2-epoxy-3-isopropoxypropane (15.0 g., 0.129 m.) with pyrazole (8.8 g., 0.129 m.), in a manner similar to that of Example I, affords DL-α-isopropoxymethylpyrazole-1-ethanol (9.1 g., 38.2%), B.P. 91.5–92.5°/1 mm., $n_D^{21}$ 1.4774.

The compound is used as follows:

DL-α-isopropoxymethylpyrazole-1-ethanol ___mg__ 100
Ethanol _____cc__ 1

Example XII

To prepare DL - α,3,5 - trimethyl - 4 - nitro-α-phenyl-pyrazole-1-ethanol, 1,2-epoxy-2-phenylpropane is reacted with 4-nitro-3,5-dimethylpyrazole in a manner similar to that of Example I.

Example XIII

The reaction of 3-(o-chlorophenoxy)-1,2-epoxypropane (35 g., 0.19 m.) with 3,5-dimethylpyrazole (18.2 g., 0.9 m.) in a manner similar to that of Example I gives DL-α - (o - chlorophenoxymethyl) - 3,5 - dimethylpyrazole-1-ethanol (25.8 g., 48.5%), M. 90.0–90.5° (uncorr.). The free base is converted to DL-α-(o-chlorophenoxymethyl)-3,5-dimethylpyrazole-1-ethanol hydrochloride in a manner similar to that in Example I, M. 110.0–112.5° (uncorr.).

DL-α-(o-chlorophenoxymethyl)-3,5-dimethylpyrazole-
  1-ethanol hydrochloride _____mg__ 50
2% Methocel (methylcellulose) MG-2326-T, Dow
  Chemical Co., Midland, Michigan _____cc__ 1

Example XIV

Catalytic reduction of DL-α,3,5-trimethyl-4-nitro-α-phenylpyrazole-1-ethanol with platinum oxide and hydrogen (60 p.s.i. gauge) affords DL-4-amino-α,3,5-trimethyl-α-phenylpyrazole-1-ethanol.

Example XV

The reaction of 3-(p-chlorophenoxy)-1,2-epoxypropane (35.0 g., 0.19 m.) with 3,5-dimethylpyrazole (18.2 g., 0.19 m.) in a manner similar to that of Example I yields DL-α-(p-chlorophenoxymethyl) - 3,5-dimethylpyrazole-1-ethanol (23.6 g., 44.4%) M. 90.5–91.5° (uncorr.). The free base is converted to DL-α-(p-chlorophenoxymethyl)-3,5-dimethylpyrazole-1-ethanol hydrochloride in a manner similar to that of Example I, M. 132–134° (uncorr.).

The compound is used in a therapeutic composition as follows:

DL - α - (p - chlorophenoxymethyl)-3,5-dimethyl-
  pyrazole-1-ethanol hydrochloride _____mg__ 1–100
Therapeutically administrable vehicle _____cc__ 1

Example XVI

The reduction of 3,5-dimethylpyrazole-4-ethanol, acetate ester, with styrene oxide in a manner similar to that of Example I affords DL-3,5-dimethyl-α¹-phenylpyrazole-1,4-diethanol,4-acetate ester. Alkaline hydrolysis yields DL-3,5-dimethyl-α¹-phenylpyrazole1,4-diethanol.

Example XVII

The reaction of glycidol (17.5 g., 0.30 m.) with 3,5-dimethylpyrazole (29.0 g., 0.25 m.) in a manner similar to that of Example I gives DL-3,5-dimethylpyrazole-1,2-propanediol (21.6 g., 50.7%) M. 95.5–97.0° (uncorr.).

The compound is used as follows:

DL-3,5-dimethylpyrazole-1,2-propanediol _____mg__ 10
Sorbital (70%) in water _____cc__ 1

Example XVIII

The reaction of 2,3-epoxy-3-phenylpentane with 4-cyano-3,5-dimethylpyrazole in a manner similar to that of Example I, yields DL-4-cyano-α-ethyl-β,3,5-trimethyl-α-phenylpyrazole-1-ethanol.

*Example XIX*

The reaction of 2,3-epoxy-1-cyclopentanol (30.0 g., 0.303 m.) with 3,5-dimethylpyrazole (29.1 g., 0.303 m.) in a manner similar to that of Example I, yields DL-3-(3,5-dimethylpyrazol-1-yl)-1,2-cyclopentanediol (8.1 g., 13.7%), M. 135–141° (uncorr.). An isomeric product (6.9 g., 11.7%), M. 107.5–109° (uncorr.), is isolated from the filtrate.

The compound is used as follows:

DL - 3 - )3,5 - dimethylpyrazol-1-yl)-1,2-cyclopentanediol _____ mg__ 1–100
Propylene glycol _____ cc__ 1

*Example XX*

The reaction of 4-(epoxyethyl)-toluene with 3,5-dimethylpyrazole in a manner similar to that of Example I gives DL-3,5-dimethyl-α-(p-tolyl)pyrazole-1-ethanol.

*Example XXI*

The reaction of styrene oxide (10.3 g., 0.0857 m.) with 4-bromo-3,5-dimethylpyrazole (15.0 g., 0.0857 m.) in a manner similar to that of Example I, gives DL-4-bromo-3,5-dimethyl-α-phenylpyrazole-1-ethanol (16.6 g.–65.6%) M. 139.0°–140.5° (uncorr.).

The compound is used in a composition as follows:

DL - 4-bromo - 3,5 - dimethyl - α - phenylpyrazole-1-ethanol _____ mg__ 50
USP syrup _____ cc__ 1

*Example XXII*

The reaction of epichlorohydrin with 3,5-dimethylpyrazole, in a manner similar to that of Example I, gives α-chloromethyl-3,5-dimethyl-pyrazole-1-ethanol.

*Example XXIII*

The reaction of 1,2-epoxy-3-(m-tolyloxy)propane (32.8 g., 0.20 m.) with 3,5-dimethylpyrazole (19.6 g., 0.20 m.) in a manner similar to Example I affords DL-3,5-dimethyl-α-(m-tolyloxymethyl)pyrazole-1-ethanol (35.5 g., 52.0%), B.P. 159–171°/0.05 mm., M. 55.0–56.0° (uncorr.).

*Example XXIV*

The reaction of 1,2-epoxy-3-butoxypropane with 3,5-dimethylpyrazole in a manner similar to that of Example I gives DL-α-butoxymethyl - 3,5 - dimethylpyrazole - 1-ethanol.

*Example XXV*

The reaction of 1,2-epoxy-3-(o-tolyloxy)propane (32.8 g., 0.20 m.) and 3,5-dimethylpyrazole (19.6 g., 0.20 m.) in a manner similar to Example I yields DL-3,5-dimethyl-α-(o-tolyloxymethyl)pyrazole-1-ethanol (31.2 g., 59.5%) M. 80.5–81.5° (uncorr.).

While the compounds of the present invention and the manner in which they are prepared have been described with some degree of particularity, it is to be understood that the invention is not so limited. The invention is to be limited only to the extent required by law in accordance with the claims appended hereto.

The invention claimed is:

1. A compound selected from the group consisting of (1) a compound of the formula:

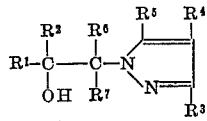

wherein $R^1$ is selected from the group consisting of halo (lower)alkyl, lower alkoxy, phenyl, phenoxy(lower)alkyl, lower alkoxyphenoxy(lower)alkyl, lower alkylphenoxy (loweralkyl), halophenoxy(lower)alkyl, trifluoromethylphenoxy(lower)alkyl, lower alkoxy(lower)alkyl and hydroxy(loweralkyl); $R^2$, $R^3$, $R^5$, $R^6$ and $R^7$ are selected from the group consisting of hydrogen and lower alkyl; and $R^4$ is selected from the group consisting of hydrogen, lower alkyl, halogen, hydroxy, lower alkoxy, hydroxy (lower)alkyl, amino and cyano and (2) the therapeutically acceptable acid addition salts thereof.

2. A compound selected from the group consisting of (1) a compound of the formula:

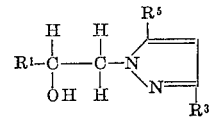

wherein $R^1$ is selected from the group consisting of halo (lower)alkyl, lower alkoxy, phenyl, phenoxymethyl, methoxyphenoxymethyl, tolyloxymethyl, chlorophenoxymethyl, trifluoromethylphenoxymethyl, lower alkoxy (lower)alkyl and hydroxy(lower)alkyl; and $R^3$ and $R^5$ are selected from the group consisting of hydrogen and lower alkyl and (2) the therapeutically administrable acid addition salts thereof.

3. DL - 3,5 - dimethyl-α-isopropoxymethylpyrazole - 1-ethanol.

4. DL - 3,5 - dimethyl-α-phenylpyrazole - 1 - ethanol hydrochloride.

5. DL - 4 - bromo - 3,5 - dimethyl-α-phenylpyrazole-1-ethanol.

6. DL - 3,5 - dimethyl-α-(m - tolyloxymethyl)pyrazole-1-ethanol.

7. DL - α - (o - chlorophenoxymethyl) - 3,5 - dimethylpyrazole-1-ethanol hydrochloride.

8. DL - 3,5 - dimethyl - α - phenoxymethylpyrazole - 1-ethanol hydrochloride.

9. DL-3,5-dimethylpyrazole-1,2-propanediol.

10. DL - 4 - amino-α,3,5-trimethyl-α-phenylpyrazole-1-ethanol.

11. DL-α-isopropoxymethylpyrazole-1-ethanol.

12. DL - 3,5-dimethyl-α¹-phenylpyrazole-1,4-diethanol.

13. DL-α-phenylpyrazole-1-ethanol hydrochloride.

References Cited by the Examiner

UNITED STATES PATENTS

| | | | |
|---|---|---|---|
| 2,004,864 | 6/1935 | Graenacher et al. | 260—309.2 |
| 3,010,963 | 11/1961 | Erner | 260—348 |
| 3,043,819 | 7/1962 | Lynn | 260—310 |

FOREIGN PATENTS 219,595   2/1962   Austria.

OTHER REFERENCES

A Technical Bulletin on Ethylene Oxide, pages 15 to 17 and 21, Houston, Jefferson Chemical Company, 1956.

Winstein et al.: in Elderfield Heterocyclic Compounds, volume 1, page 24, New York, Wiley, 1950.

WALTER A. MODANCE, *Primary Examiner.*

N. TROUSOF, *Assistant Examiner.*